US012411726B2

(12) United States Patent
Edamadaka et al.

(10) Patent No.: US 12,411,726 B2
(45) Date of Patent: Sep. 9, 2025

(54) METHOD AND SYSTEM FOR SOLVING FOR SEAMLESS RESILIENCY IN A MULTI-TIER NETWORK FOR GREY FAILURES

(71) Applicant: JPMorgan Chase Bank, N.A., New York, NY (US)

(72) Inventors: Rajeshwari Edamadaka, Allentown, NJ (US); Diarmuid Leonard, Galway (IE); Nigel T Cook, Boulder, CO (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 38 days.

(21) Appl. No.: 18/142,254

(22) Filed: May 2, 2023

(65) Prior Publication Data
US 2023/0359520 A1    Nov. 9, 2023

Related U.S. Application Data

(60) Provisional application No. 63/364,092, filed on May 3, 2022.

(51) Int. Cl.
*G06F 11/07* (2006.01)
(52) U.S. Cl.
CPC ...... *G06F 11/0793* (2013.01); *G06F 11/0709* (2013.01); *G06F 11/079* (2013.01)
(58) Field of Classification Search
CPC .............. G06F 11/0709; G06F 11/079; G06F 11/0793; G06F 11/1464; G06F 11/2041
See application file for complete search history.

(56) References Cited

U.S. PATENT DOCUMENTS

2021/0157694 A1    5/2021  Dye et al.

OTHER PUBLICATIONS

Haken, Michael, "Advanced Multi-AZ Resilience Patterns: Detecting and Mitigating Gray Failures", Mar. 2, 2022, Amazon Web Services (Year: 2022).*
"Amazon CloudWatch User Guide", Nov. 17, 2021, Amazon Web Services, pp. i-xii, 1-9, 154-231, 937-959 (Year: 2021).*
Haken, Michael, "Advanced Multi-AZ Resilience Patterns: Detecting and Mitigating Gray Failures", Jul. 11, 2023, Amazon Web Services (Year: 2023).*

(Continued)

*Primary Examiner* — Michael Maskulinski
(74) *Attorney, Agent, or Firm* — GREENBLUM & BERNSTEIN, P.L.C.

(57) ABSTRACT

An automatically self-healing multi-tier system for providing seamless resiliency for end users is provided. The system includes a plurality of tiers of elements; a processor; a memory; and a communication interface. The processor is configured to determine whether each respective tier of elements satisfies each of a plurality of intrinsic observer capabilities, a plurality of intrinsic reactor capabilities, a plurality of first health checks received from an internal tier, and a plurality of second health checks received from an external tier. When any of the intrinsic observer capabilities and the intrinsic reactor capabilities are not satisfied, an extrinsic observer capability and/or an extrinsic reactor capability is used to compensate for the unsatisfied capability. When any of health checks discover a degradation of service, communication flows are routed so as to fully or partially avoid the affected tier of elements.

16 Claims, 6 Drawing Sheets

(56) References Cited

OTHER PUBLICATIONS

Jia et al., "Rapid Detection and Localization of Gray Failures in Data Centers via In-band Network Telemetry", NOMS 2020-2020 IEEE/IFIP Network Operations and Management Symposium (Year: 2020).*

Huang et al., "Gray Failure: The Achilles' Heel of Cloud-Scale Systems", May 8-10, 2017, HotOS '17, pp. 150-155 (Year: 2017).*

Huang et al., "Capturing and Enhancing In Situ System Observability for Failure Detection", Oct. 8-10, 2018, 13th USENIX Symposium on Operating Systems Design and Implementation (OSDI '18), pp. 1-15 (Year: 2018).*

International Search Report and Written Opinion in corresponding International Application No. PCT/US2023/020673, dated Jul. 27, 2023.

AWS, Reliability Pillar AWS Well-Architected Framework, Amazon Web Services, Feb. 19, 2021.

Berenberg A. et al., Deployment Archetypes for Cloud Applications, ACM Computing Surveys, vol. 55, No. 3, Article 61 (pp. 61:1-61:48), Feb. 3, 2022.

Benson T. et al., CloudNaaS: A Cloud Networking Platform for Enterprise Applications, Proceedings of the $2^{nd}$ ACM Symposium on Cloud Computing, p. 1-13, Oct. 26, 2011.

* cited by examiner

METHOD AND SYSTEM FOR SOLVING FOR SEAMLESS RESILIENCY IN A MULTI-TIER NETWORK FOR GREY FAILURES

CROSS-REFERENCE TO RELATED APPLICATIONS

This application claims the benefit of U.S. Provisional Patent Application Ser. No. 63/364,092, filed May 3, 2022, which is hereby incorporated by reference in its entirety.

BACKGROUND

1. Field of the Disclosure

This technology generally relates to methods and systems for addressing failures in a cloud-based data center, and more particularly to methods and systems for mitigating partial and intermittent failures in a distributed cloud-based data center in order to provide resiliency and continuity for end users.

2. Background Information

A private or public cloud data center provides scalable compute infrastructure together with backing, i.e., dependent services, in multiple availability zones, data centers and geographic regions. Each data center provides many other aspects, such as a geo-proximity-aware load balancers, distributed database nodes, caches, elastic search clusters, object stores, authentication and authorization services and other software-as-a-service functionality. Experiences with event driven, elastically scalable, cloud native microservice solutions are typically deployed as multiple instances in each availability zone for scale and high availability. The complexity of an application further increases as the applications have integrations with other internal or external vendor systems, or services with additional redundancy. The engineering of a highly resilient cloud solution may become additionally complex, especially if it is a low-latency, real time, mission-critical application performing in an inherently stateful domain.

Grey failures are a class of failures that are not a clean up or down, but a partial failure. Grey failures often escape detection, because typical health checks are coarse grained and do not detect when only a portion of the requests fail. They may occur at any element in the multi-tier distributed network, including within applications, load balancers or routers. An application may appear to be a normally functioning application to observers, such as system-wide telemetry or even load balancers that are periodically probing the application's health check endpoints. However, some end users could experience issues when using the application.

Grey failure characteristics include long lead times in debugging, difficulty in diagnosing the root cause and being harder to solve. The overall system experiences latent failures, which progress to degradation may be visible in other parts of the solution. Downstream elements' telemetry then show high failure rates and are erroneously restarted to restore service, which in turn may cause overloading and other cascaded failures. However, the original cause of the failure has not been addressed, and this results in the repetition of the error, resulting in a thrashing behavior in the environment. Overall, grey failures may include a subset of operations failing with vendor systems, intermittent requests failing or having large latencies, some of the end user client operations failing in addition to performance degradation, sporadic packet loss, flaky I/O, memory thrashing, and/or back pressure build-up of applications.

Systemic issues with single point of failure elements, such as a core network router, typically happen inside a localized spot such as an availability zone. Removing the applications from the affected availability zone is an ideal response.

It has been observed that what exacerbates grey failures in highly distributed environment is actually adding extra redundancy to provide resiliency. However, this may give rise to a paradox in cloud-scale solutions. Any attempt to improve resiliency with additional availability zones may have the opposite effect through grey failures. It is believed that vertical isolation of an availability zone, such as shutting down the services, actually increases service availability. Vertical isolation refers to containment of the deployed instances delivering the functionality as well as restricting the flow of requests to stay within an availability zone.

Omnipresent service availability ideally requires well-behaved cloud elements at every tier, but in reality there is a need to develop tactical strategies in addition to inherently resilient architectures and self-healing applications. In addition, it is important to address how to provide automated resiliency techniques for mission critical applications that require high availability of at least 99.99% or 99.999%, which is an ultimate engineering challenge.

To create an always-on end user experience, the solution needs to be resilient in spite of failures that can occur at any element and any tier in the network, not just within the application authored by software engineers. Client requests from the end user application need to traverse multiple elements, such as firewalls, load balancers, domain name system (DNS) resolvers, application programming interface (API) gateways, vendor systems, cloud platforms, software delivery networks and telemetry systems. Each of these elements has a varying degree of observer and reactor capabilities. Here, an observer is any element that has the ability to observe the health of a system as it functions and processes requests or events. The observer is capable of detecting health through a variety of ways, such as, for example, in line requests, i.e., passive health checks, and periodic health checks, i.e., active health checks. The observer can invoke deep health checks, implemented asynchronously, by an application which considers the availability of downstream backing or dependent services. Passive health checks are the derived metrics from the normal traffic or requests being received by the element while operating. Active health checks are deliberate, periodic health checks performed by the application to monitor health.

The health check of an application needs to include success metrics and latency of responses. Similarly, a reactor is any element that has the ability to take a resiliency action. An example is to fail away from sending requests to a downstream element that is exhibiting degradation, and using some sort of probing intelligence to fail back. The well-behaved element has one or more intrinsic automated reactor solutions. Automated reactor solutions should avoid "flapping" by maintaining a history of its recent actions and actions of its peers in other availability zones.

With the opportunities increasing in the cloud computing era, the complexity of solutions has also exponentially increased. There are a variety of deployments such as private cloud, public cloud, hybrid cloud, edge or regional networks, and a blend of Infrastructure as a Service (IaaS), Platform as a Service (PaaS), and Software as a Solution Service (SaaS) and vendor software.

Modern times bring additional complexities such as ever-increasing internet traffic and cyberattacks, all of which together results in a challenging environment to maintain always available services. The average cost of downtime per hour of any cloud service has also increased, and any outage negatively affects both product revenue and customer satisfaction. Furthermore, mission critical domains such as telecommunications or finance, characterized by massive traffic requiring low latency traffic, face an uphill challenge to offer continuous availability. The higher the required availability e.g. 5 9's, i.e., 99.999% can afford only 0.001% downtime in a year, which equates to 6 seconds per week.

Highly distributed networks contain a paradox, that by increasing redundancy, the availability of an element can actually be reduced. This is exemplified with grey failures—a class of failures where the element (i.e., an application or network element) is neither fully up or nor fully down, but in a degraded state. The higher the number of redundant elements in each tier and increasing number of tiers in a multi-network cloud environment is an ecosystem, where failures are bound to happen and can occur at any time. There are various types of elements in a multi-tier deployment between the end user client (i.e., browser, mobile app, etc.) and the service running on a cloud platform, such as: local routers, internet, fire walls, load balancers, API gateways, additional proxies, L7 routers, cloud platforms, software defined networks and hardware. Each of these tiers has many instances for redundancy, thus significantly increasing the number of elements. Even if the possibility of an individual element failing is quite low, the overall probability that there is a failure at any time within the entire ecosystem increases. When a failure does occur, manual intervention is needed to mitigate the customer impact and find the root cause and fix the issue. The mean time to restoration can be larger than ideal thus preventing reaching 5 9's up time making it a bigger challenge to achieve always on experience for mission critical domain applications.

Therefore, instead of accepting the inevitable failures and their manual remediation, the path to an always-on user experience is to create self-healing systems that recognize failures and automatically trigger corrective actions. Thus, the quest is to find designs and methodology can help achieve seamless resiliency in these multi-tier networks which accommodate the full range of failures.

Typically, the current art involves scaling out by adding additional instances of the same element, such as, for example, a web server or a router behind a load balancer. In some circumstances, such as for a lower reliability application with 3 9s i.e. 99.9%, this may be adequate, but this is not adequate for 5 9's (99.999%) or 6 9's (99.9999%) applications in the cloud.

Applications are encouraged to create a health check endpoint that load balancers can use to see if the application is healthy and decide to send traffic to it or not. However, the periodicity of the health check is not frequent enough to avoid sending traffic to a dead or impaired application nor is there sufficient sensitivity for low latency mission critical applications. Race condition between consecutive layers of interim routers/load balancers when an application is degraded or down, ends up allowing traffic to sneak through thus encountering failures. When an element has a systemic failure, one cannot remove that subsection of the multi-tier network without properly planned isolation in the network.

Health checks need to fail three consecutive times for a zone to be marked as unavailable, but the problem is that each health check can take a random path—one of many in the multi-tier network. Thus it can guarantee that one of many possible paths is working, signaling the health of the proxy and application instance that it happened to traverse through in that one flow. This is not a guarantee that all application instances are working, nor does it factor in any network latency into account. Health checks can be simple, e.g., port pings. Even with a custom health check of the application, a load balancer can continue to send traffic to an overwhelmed interim router. Partial failures, e.g., when there is a flaky path, will not be deterministically taken into account in the health checks.

Just like an application can encounter failure, many of the interim elements can fail too, and users are impacted when these issues are not detected in a timely manner. If the degradation is due to a grey failure, then these issues are not detected at all by the application and system level health checks and telemetry. This can cause additional traffic to be routed through or routed to impaired elements, thus worsening the latency and health, causing a downward spiral and cascaded failures seen somewhere else in the system, while obscuring the origin of the issue.

Most often the emphasis is to stop the client impacts and focus on failing away and not enough attention is paid to failing back. This is critical because another failure can follow the first, thus further narrowing the health portion of the network, thereby reducing redundancy. Restoring the original level of redundancy is critical, and it is important to find solutions that allow us to fail back and not just fail away, but current art does not focus sufficiently on doing this in an automated way at every tier.

In other cases, the load balancer is simply a DNS resolver that has DNS caching as limitations that are not sensitive to real time application availability.

There are many types of interim load balancers between the end user client and the application or service such as firewalls, API gateways, proxies and routers, DNS resolvers and IP sprayers. The health checks and load balancing algorithms are often too simplistic and have inconsistent types of configurations and capability and are not consistent in their sensitivity and ability to detect failures downstream and steer traffic away. Most of the failures occur with the interim load balancers, which are not investigated often enough.

To compound matters, a lot of the failures occur when a change is introduced as a planned event due to maintenance activity, configuration change, software update, etc. Changes introduced in interim elements can impact/drop client requests, let traffic through due to race conditions between health checks, or have breaking changes where all elements must be taken down/restarted.

Client-side load balancing can be an option when the client is internal and has access to different clusters, but not if the client is coming in from the public internet and topology is purposefully hidden.

Client side retries will create user impact by making the user wait for a longer period and will need to be the last resort if intermediate elements cannot self-heal. Too many retries within the system can create a flood of traffic causing cascading failures.

Since the multi-tiered network is complex, there is often a lack of awareness of the full topology and confusion on what redundancy is there. Traffic can continue to go to dead/stopped servers due to lack of health checks. There is confusion on whose responsibility it is to achieve self-healing behavior, and a delegation of health check to another element, such as, for example, a DNS resolver. While application developers know about their applications, the cloud network engineers are similarly well versed regarding their network elements. But sufficient end-to-end knowledge of multi-tier deployments, weak points within the path of traffic and method of detecting the root cause for failures, and ways to design self-healing systems are not easily found. However, the application architects and developers are responsible for owning production incidents impacting the end user and often go through tedious, and convoluted triaging and remediation processes involving multiple network teams. All the while they are challenged due to fuzziness about the end-to-end network topology, each interim element's capability, configuration, and insufficient telemetry at each tier in the network path.

Telemetry is often confused and cannot perform corrective actions such as self-healing by failing away when an error occurs or failing back at the optimal time. Synthetic transaction is not a silver bullet, as it only can flag a deterioration or failure, similar to distributed tracing which can additionally identify which segment has higher latencies in a multi-tier network.

Any custom application built to track failures or increased latencies in app/API specific logs in the intervening elements is limited to the particular app and cannot scale to thousands of such applications. A more general framework is needed to do this.

Cloud platforms are in turn dependent on Software Defined Networks (SDNs), where grey or hard stop failures can happen. These in turn have tier 0 or tier 1 routers. Platforms are not always able to detect network issues, and do not distinguish sensitive apps.

All the above limitations pave the way to a proposed solution as provided in the present disclosure, which aims to resolve these challenges through a system design and methodology of well-behaved self-healing elements at each layer of the multi-tier network, thus making mission critical applications a possibility in the cloud.

Accordingly, there is a need for a method and a system for mitigating partial and intermittent failures in a distributed cloud-based data center in order to provide resiliency and continuity for end users.

SUMMARY

The present disclosure, through one or more of its various aspects, embodiments, and/or specific features or sub-components, provides, inter alia, various systems, servers, devices, methods, media, programs, and platforms for mitigating partial and intermittent failures in a distributed cloud-based data center in order to provide resiliency and continuity for end users.

According to an aspect of the present disclosure, a method for mitigating a failure in a distributed cloud-based data center is provided. The distributed cloud-based data center includes at least two availability zones, and each respective availability zone includes a corresponding plurality of components. The method is implemented by at least one processor. The method includes: checking, by the at least one processor, each respective component from among a first plurality of components included in a first availability zone; detecting, by the at least one processor, at least one partial failure that is associated with at least one component from among the first plurality of components; routing, by the at least one processor, at least one communication flow so as to avoid the at least one component for which the at least one partial failure has been detected; generating, by the at least one processor, a notification message that includes information that relates to the detected at least one partial failure; and transmitting, by the at least one processor, the notification message to a predetermined destination.

The checking may include measuring, for each respective component, at least one health metric that indicates whether the respective component is functioning normally.

The checking may further include: generating a synthetic service request; routing the synthetic service request so as to propagate via each of the first plurality of components; receiving, from each respective component, a corresponding response to the synthetic service request; and using each received response to measure each corresponding at least one health metric.

The routing may include routing the at least one communication flow so as to avoid the first availability zone.

The method may further include: determining, based on a result of checking each respective component from among a second plurality of components included in a second availability zone, that all components in the second plurality of components are functioning normally. The routing may further include routing the at least one communication flow so as to propagate via the second availability zone.

The method may further include: receiving information indicating that an operational functionality has been restored for the at least one component for which the at least one partial failure has been detected; and rerouting the at least one communication flow so as to propagate through the at least one component for which the operational functionality has been restored.

The method may further include updating a database with information that relates to a number of partial failures that are detected within a predetermined time interval.

The method may further include updating the database with information that relates to a number of components that are determined as functioning normally within the predetermined time interval.

The at least one partial failure may include at least one from among a hardware failure, a network disruption, a communication overload, a performance degradation, a random packet loss, an input/output glitch, a memory thrashing, a capacity pressure, and a non-fatal exception.

According to another exemplary embodiment, a computing apparatus for mitigating a failure in a distributed cloud-based data center is provided. The distributed cloud-based data center includes at least two availability zones, and each respective availability zone includes a corresponding plurality of components. The computing apparatus includes a processor; a memory; and a communication interface coupled to each of the processor and the memory. The processor is configured to: check each respective component from among a first plurality of components included in a first availability zone; detect at least one partial failure that is associated with at least one component from among the first plurality of components; route at least one communication flow so as to avoid the at least one component for which the at least one partial failure has been detected; generate a notification message that includes information that relates to the detected at least one partial failure; and transmit, via the communication interface, the notification message to a predetermined destination.

The processor may be further configured to measure, for each respective component, at least one health metric that indicates whether the respective component is functioning normally.

The processor may be further configured to: generate a synthetic service request; route the synthetic service request so as to propagate via each of the first plurality of components; receive, from each respective component, a corresponding response to the synthetic service request; and use each received response to measure each corresponding at least one health metric.

The processor may be further configured to route the at least one communication flow so as to avoid the first availability zone.

The processor may be further configured to: determine, based on a result of checking each respective component from among a second plurality of components included in a second availability zone, that all components in the second plurality of components are functioning normally; and route the at least one communication flow so as to propagate via the second availability zone.

The processor may be further configured to: receive information indicating that an operational functionality has been restored for the at least one component for which the at least one partial failure has been detected; and reroute the at least one communication flow so as to propagate through the at least one component for which the operational functionality has been restored.

The processor may be further configured to update a database with information that relates to a number of partial failures that are detected within a predetermined time interval.

The processor may be further configured to update the database with information that relates to a number of components that are determined as functioning normally within the predetermined time interval.

The at least one partial failure may include at least one from among a hardware failure, a network disruption, a communication overload, a performance degradation, a random packet loss, an input/output glitch, a memory thrashing, a capacity pressure, and a non-fatal exception.

According to yet another exemplary embodiment, a non-transitory computer readable storage medium storing instructions for mitigating a failure in a distributed cloud-based data center is provided. The distributed cloud-based data center includes at least two availability zones, and each respective availability zone includes a corresponding plurality of components. The storage medium includes executable code which, when executed by a processor, causes the processor to: check each respective component from among a first plurality of components included in a first availability zone; detect at least one partial failure that is associated with at least one component from among the first plurality of components; route at least one communication flow so as to avoid the at least one component for which the at least one partial failure has been detected; generate a notification message that includes information that relates to the detected at least one partial failure; and transmit the notification message to a predetermined destination.

When executed by the processor, the executable code may be further configured to cause the processor to measure, for each respective component, at least one health metric that indicates whether the respective component is functioning normally.

According to still another exemplary embodiment, an automatically self-healing multi-tier system for providing seamless resiliency is provided. The system includes a plurality of tiers of elements; a processor; a memory; and a communication interface coupled to the processor, the memory, and each respective tier of elements from among the plurality of tiers of elements. The processor is configured to determine whether each respective tier of elements satisfies each of a plurality of intrinsic observer capabilities, a plurality of intrinsic reactor capabilities, a plurality of first health checks received from an internal tier, and a plurality of second health checks received from an external tier. When at least one from among the plurality of intrinsic observer capabilities and the plurality of intrinsic reactor capabilities is not satisfied, the processor is configured to use at least one from among a plurality of extrinsic observer capabilities and a plurality of extrinsic reactor capabilities to compensate for the unsatisfied capability. When at least one from among the plurality of first health checks and the plurality of second health checks is not satisfied, the processor is configured to route at least one communication flow so as to avoid the tier of elements for which the corresponding health check is not satisfied.

The processor may be further configured to measure, for each respective tier of elements, at least one health metric that indicates whether the respective tier of elements is well-behaved.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
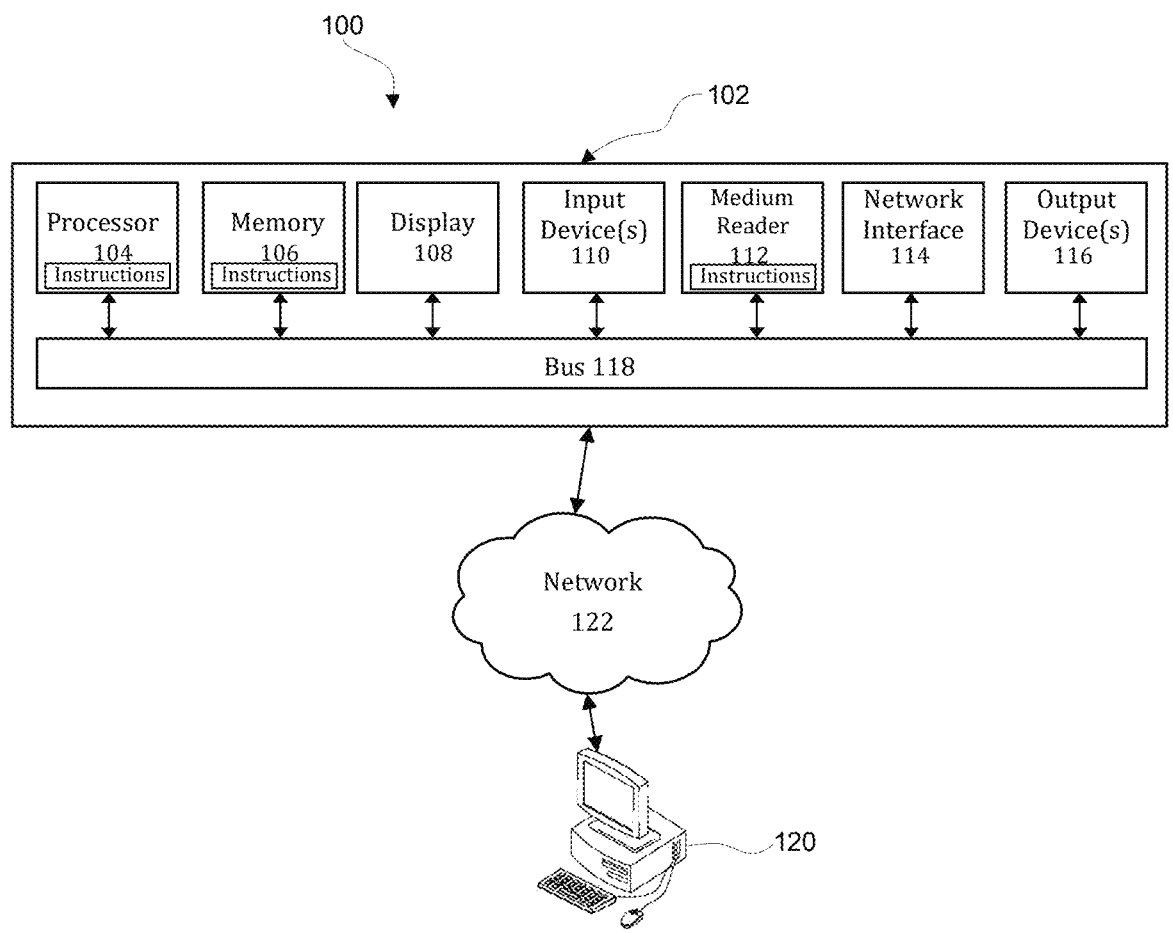
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for mitigating partial and intermittent failures in a distributed cloud-based data center in order to provide resiliency and continuity for end users.

Figure 2:
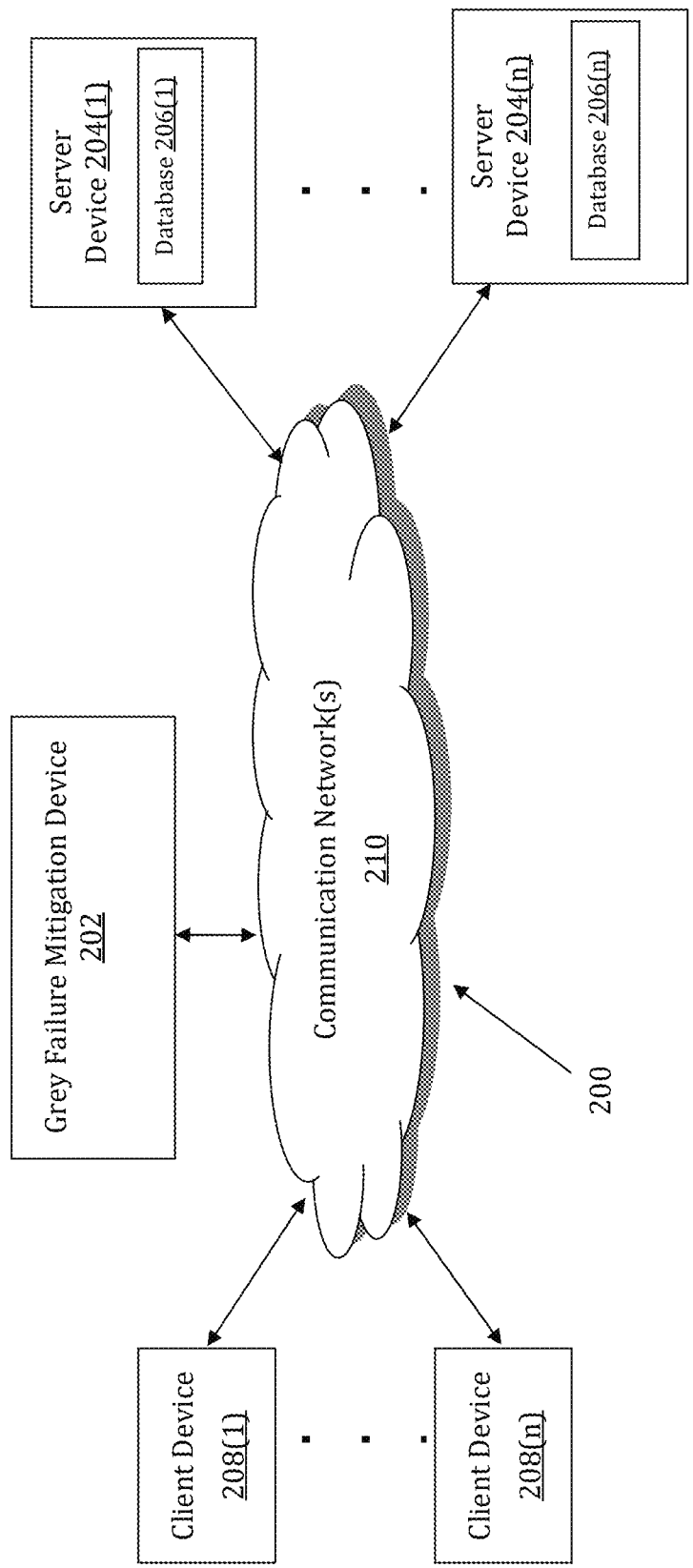
FIG. 2 illustrates an exemplary diagram of a network environment.

Referring to FIG. 2, a schematic of an exemplary network environment 200 for implementing a method for mitigating partial and intermittent failures in a distributed cloud-based data center in order to provide resiliency and continuity for end users is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for mitigating partial and intermittent failures in a distributed cloud-based data center in order to provide resiliency and continuity for end users may be implemented by a Grey Failure Mitigation (GFM) device 202. The GFM device 202 may be the same or similar to the computer system 102 as described with respect to FIG. 1. The GFM device 202 may store one or more applications that can include executable instructions that, when executed by the GFM device 202, cause the GFM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the GFM device 202 itself, may be located in virtual server(s) running in a cloud-based computing environment rather than being tied to one or more specific physical network computing devices. Also, the application(s) may be running in one or more virtual machines (VMs) executing on the GFM device 202. Additionally, in one or more embodiments of this technology, virtual machine(s) running on the GFM device 202 may be managed or supervised by a hypervisor.

In the network environment 200 of FIG. 2, the GFM device 202 is coupled to a plurality of server devices 204(1)-204(n) that hosts a plurality of databases 206(1)-206(n), and also to a plurality of client devices 208(1)-208(n) via communication network(s) 210. A communication interface of the GFM device 202, such as the network interface 114 of the computer system 102 of FIG. 1, operatively couples and communicates between the GFM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the GFM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and GFM devices that efficiently implement methods and systems for mitigating partial and intermittent failures in a distributed cloud-based data center in order to provide resiliency and continuity for end users.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The GFM device 202 may be a standalone device or integrated with one or more other devices or apparatuses, such as one or more of the server devices 204(1)-204(n), for example. In one particular example, the GFM device 202 may include or be hosted by one of the server devices 204(1)-204(n), and other arrangements are also possible. Moreover, one or more of the devices of the GFM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the GFM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in an availability zone, which may include internal or external networks. The server devices 204(1)-204(n) hosts the databases 206(1)-206(n) that are configured to store data that relates to health checks of data center components and metrics for measuring availability and resiliency of data center components.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the GFM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the GFM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the GFM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the GFM device 202, the server devices 204(1)-204(n), or the client devices 208(1)-208(n), for example, may be configured to operate as virtual instances on the same physical machine. In other words, one or more of the GFM device 202, the server devices 204(1)-204(n), or the client devices 208(1)-208(n) may operate on the same physical device rather than as separate devices communicating through communication network(s) 210. Additionally, there may be more or fewer GFM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
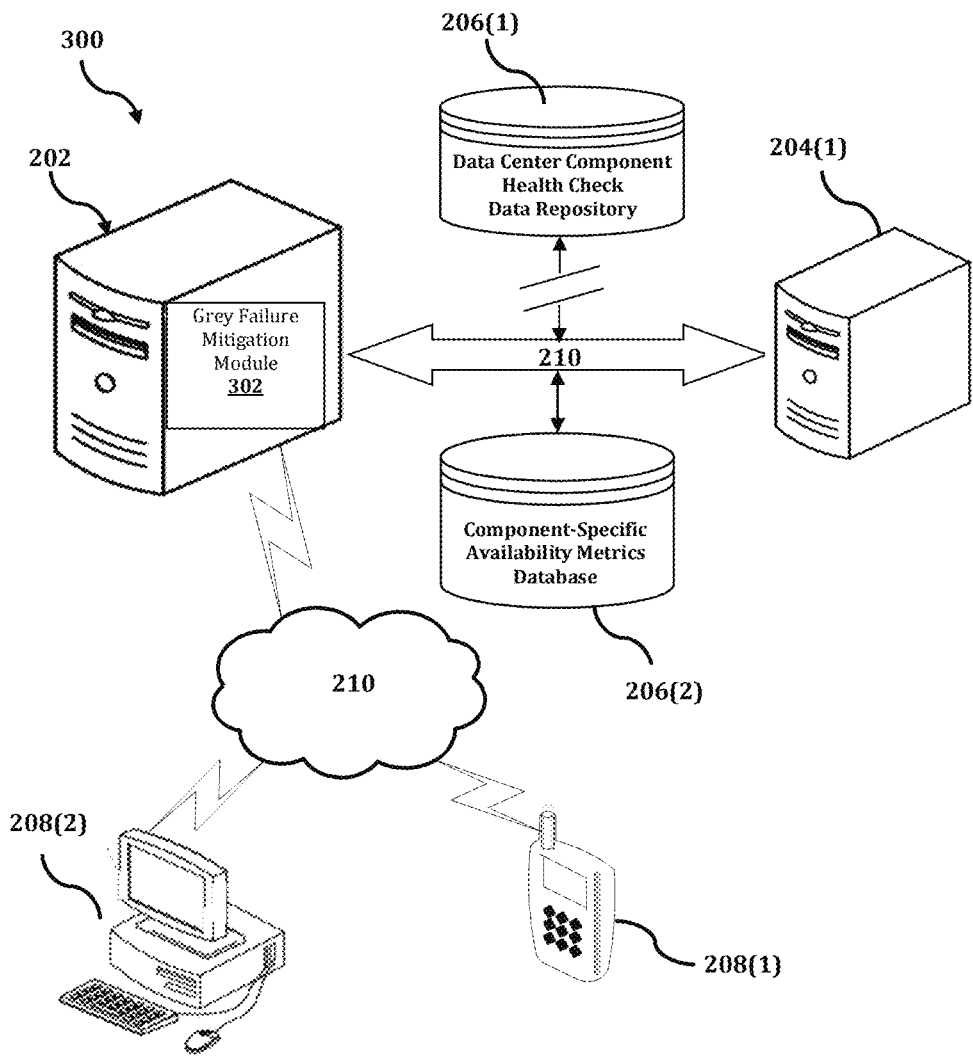
FIG. 3 shows an exemplary system for implementing a method for mitigating partial and intermittent failures in a distributed cloud-based data center in order to provide resiliency and continuity for end users.

The GFM device 202 is described and illustrated in FIG. 3 as including a grey failure mitigation module 302, although it may include other rules, policies, modules, databases, or applications, for example. As will be described below, the grey failure mitigation module 302 is configured to implement a method for mitigating partial and intermittent failures in a distributed cloud-based data center in order to provide resiliency and continuity for end users.

An exemplary process 300 for implementing a mechanism for mitigating partial and intermittent failures in a distributed cloud-based data center in order to provide resiliency and continuity for end users by utilizing the network environment of FIG. 2 is illustrated as being executed in FIG. 3. Specifically, a first client device 208(1) and a second client device 208(2) are illustrated as being in communication with GFM device 202. In this regard, the first client device 208(1) and the second client device 208(2) may be "clients" of the GFM device 202 and are described herein as such. Nevertheless, it is to be known and understood that the first client device 208(1) and/or the second client device 208(2) need not necessarily be "clients" of the GFM device 202, or any entity described in association therewith herein.

Any additional or alternative relationship may exist between either or both of the first client device 208(1) and the second client device 208(2) and the GFM device 202, or no relationship may exist. For example, the GFM device 202 and the first client device 208(1) may be configured as the same physical device.

Further, GFM device 202 is illustrated as being able to access a data center component health check data repository 206(1) and a component-specific availability metrics database 206(2). The grey failure mitigation module 302 may be configured to access these databases for implementing a method for mitigating partial and intermittent failures in a distributed cloud-based data center in order to provide resiliency and continuity for end users.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the GFM device 202 via broadband or cellular communication. Alternatively, the process may be executed by the GFM device 202 in a standalone manner, e.g., by a smart phone on which the interaction services routing and handling module 302 has been downloaded. Of course, these embodiments are merely exemplary and are not limiting or exhaustive.

Upon being started, a processor that is hosted in the GFM device 202 executes a process for mitigating partial and intermittent failures in a distributed cloud-based data center in order to provide resiliency and continuity for end users. An exemplary process for mitigating partial and intermittent failures in a distributed cloud-based data center in order to provide resiliency and continuity for end users is generally indicated at flowchart 400 in FIG. 4.

Figure 4:
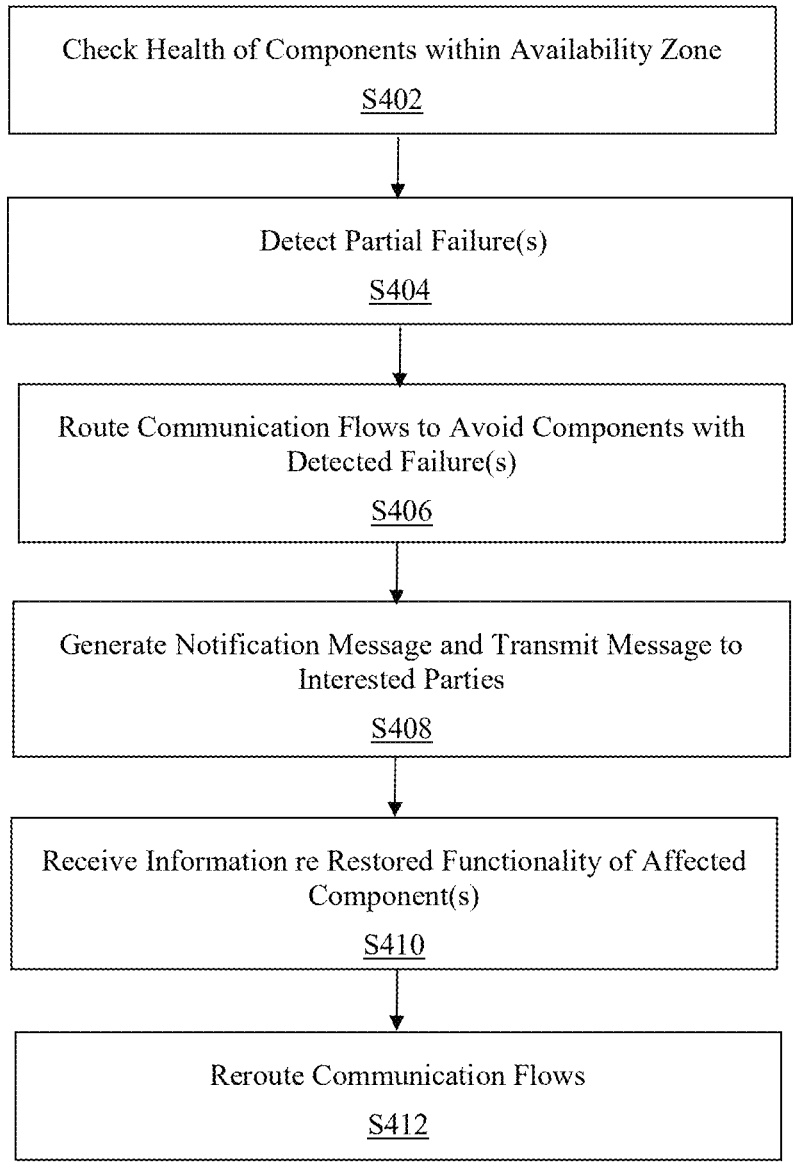
FIG. 4 is a flowchart of an exemplary process for implementing a method for mitigating partial and intermittent failures in a distributed cloud-based data center in order to provide resiliency and continuity for end users.

In process 400 of FIG. 4, at step S402, the grey failure mitigation module 302 checks each respective component from among a particular set of components to determine whether the respective component has experienced a partial failure, also referred to herein as a "grey failure," i.e., either an intermittent failure, or an impaired performance. In an exemplary embodiment, the distributed cloud-based data center includes at least two availability zones, and each availability zone includes a corresponding plurality of components, and the health check is performed on each component within a particular availability zone.

In an exemplary embodiment, the check of each respective component includes measuring a health metric that indicates whether or not the respective component is functioning normally. For example, the check may include generating a synthetic service request; routing the synthetic service request so as to propagate via all of the components within a particular availability zone; receiving corresponding responses to the synthetic service request; and using the received responses to measure the corresponding health metrics. In an exemplary embodiment, the health metric may include any one or more of a Hyper Text Transfer Protocol (HTTP) response time metric, a response time zscore metric, a number of anomalies metric, a number of HTTP errors metric, and a pool unavailability score metric. The zscore may be calculated by obtaining a current value of the response time, subtracting a weekly average therefrom, and then dividing this difference by a standard deviation of the response time that is based on a week of data. The pool unavailability score may be calculated by obtaining a response time associated with strange or unexpected responses to an error response time and then dividing this sum by two.

At step S404, the grey failure mitigation module 302 detects at least one partial failure that is associated with at least one of the components checked in step S402. The partial failure may include any one or more of a hardware failure, a network disruption, a communication overload, severe performance degradation, random packet loss, flaky input/output, memory thrashing, capacity pressure, non-fatal exceptions, and/or any other type of problem, malfunction, or operational failure.

At step S406, the grey failure mitigation module 302 routes communication flows so as to avoid any component for which a partial failure has been detected in step S404. In an exemplary embodiment, the communication flows may be routed so as to completely avoid the availability zone for which the health checks are performed in step S402. For example, when a partial failure is detected in at least one component within a first availability zone, a check may be performed upon the components included in a second availability zone, and if, as a result of this check, a determination is made that all of the components included in the second availability zone are functioning normally, then the communication flows that normally would propagate via the first availability zone may be routed so as to propagate via the second availability zone.

At step S408, the grey failure mitigation module 302 generates a notification message that includes information that relates to the partial failure detected in step S404, and then transmits the notification message to interested parties. For example, when a particular type of component experiences a grey failure, the notification message may be sent to users that are currently active in the distributed cloud-based data center, and also to personnel that are responsible for maintaining that particular type of component.

When a grey failure occurs and appropriate personnel are notified of the grey failure, the component may eventually be repaired and/or an operational functionality of the component may be restored. Thus, at step S410, the grey failure mitigation module 302 receives information indicating that operational functionality has been restored for the component(s) for which the grey failure(s) were detected at step S404. Then, at step S412, the grey failure mitigation module may reroute the communication flows so as to propagate through the component(s) for which operational functionality has been restored, thereby returning the operational state of the distributed cloud-based data center back to a normal state.

In an exemplary embodiment, the grey failure mitigation module 302 tracks the health of the components on a continuous basis by updating a database with information that relates to a number of partial failures that are detected within a predetermined time interval, such as a week, a month, or a year, and also by updating the database with information that relates to a number of components that are determined as functioning normally within the predetermined time interval.

The paradox with distributed cloud-scale systems is that increased redundancy leads to lower service availability. As distributed systems become larger and more complex with multiple tiers, failures can occur at more points in the solution, and failures inevitably happen. In particular, there is a class of failures known as "grey failures" that are quite difficult to solve and yet are the most common errors found in private or public cloud platforms. The present disclosure describes grey failures, which are inevitable in distributed cloud-scale systems, and introduces a set of techniques to address the grey failures. This is crucial to create highly resilient, mission-critical applications that run in a chaotic cloud environment, rife with possibility of failures and "Rotate, Repair and Repave" (also referred to herein as "3R") events.

Large-scale, distributed systems provide greater resiliency by increasing availability. Failures can occur in any element within a distributed system. More components inexorably translates into a higher total probability of a failure occurring at any point in the system. Private or public data centers are prime examples of cloud-scale (i.e., extremely large) distributed systems with multiple tiers. Failures may include hardware failures, network disruptions, or severely overloaded systems. Failures are not limited to complete failures but also include intermittent and impaired performance failures known as grey failures. With increasingly distributed systems, more microservices, and tiered network zones, with a proliferation of load balancers, and planned and unplanned 3R's in the cloud ecosystems, the cloud continues to be a chaotic environment. Hence, defining patterns to handle grey failures and resiliency engineering is a primary consideration which will help software engineers, cloud platform, infrastructure and site reliability engineers alike.

Mitigation techniques for grey failures, including those that have been successfully used in massive, mission-critical and low-latency applications, are illustrated. The present disclosure includes a description of a well-behaved distributed cloud ecosystem and design techniques that may provide automated self-healing and resiliency capabilities towards achieving an always-on, seamless experience for users. Observer patterns that may be used for telemetry, monitoring and reactor patterns for fail away and fail back are also described. These patterns may be used by engineering teams for creating a highly resilient element of any type, in a multi-tier distributed network.

In principle, all elements should be well behaved in a distributed cloud scale network, including vendor systems and smart load balancers, in every tier of a multi-tier network.

In an exemplary embodiment, a method for mitigating partial and intermittent failures in a distributed cloud-based data center may rely on some of the most common and ubiquitous elements, such as Load Balancers (LBs) and/or Proxies, and expect them to be well-behaved to ensure resiliency as traffic flows from clients to applications in an end to end traffic flow. These LBs are configured to probe downstream endpoints, perform health checks, adjust the list of downstream elements based on successful health check results, continue probing and restore previously unhealthy elements when they become available. In addition, the LBs support zero downtime maintenance or upgrades with quiescence support and connection drainage.

Applications with vertical isolation across availability zones: In an exemplary embodiment that relies upon an event driven microservices architecture with Kafka, producers and consumers across multiple availability zones publish and consume from shared Kafka topics. Shared Kafka topics are those where consumers in multiple availability zones can consume events from a common Kafka cluster spanning multiple availability zones. Events are consumed by microservices in consumer groups randomly across the availability zones. Furthermore, in an event choreography, there may be several hops where microservices across multiple availability zones publish to a topic and others consume and publish in turn to other topics. Kafka provides both load balancing and resiliency innately by distributing partitions to surviving consumer instances if there are intrinsic failures or network connectivity failures for a consumer. In such a situation, if there is a systemic failure within an availability zone, there is a very high chance of almost all traffic getting affected.

In order to handle grey failures due to systemic network degradation within an availability zone, crisscrossing between availability zones is to be avoided. Special types of sticky Kafka assignors may be used in conjunction with a routing key in order to route all hops for an end-to-end request flow preferably within an availability zone. This also has the effect of maintaining strict order of events for a given key. This requires the assignor's producer partitioner to map a key deterministically to an availability zone. This is a preference that keeps all the hops in the event choreography within the same availability zone under normal conditions, with the caveat that all the topics in the hop are created with the same number of partitions. When there is a systemic failure in an availability zone, only the portion of traffic traversing that availability zone is affected. By removing the availability zone from rotation, the grey failure is effectively isolated, and Kafka will automatically rebalance the partitions to the surviving availability zone.

In an exemplary embodiment, when a central network element severely degrades severely and begins to impact ingress and egress traffic, this Kafka sticky partition assignor is designed to protect the traffic in the nonimpacted availability zone. Thus, this design provides automated resiliency while scaling up, preserving event ordering, and achieving low latency while handling grey failures.

Other techniques extend to occasions when an application's subset of sessions to external systems may be erroring out while being insufficient to fail the health check. In such situations, the microservice can delegate the request to another availability zone that may have better connectivity success with the external system.

In an exemplary embodiment, when health checks are rich enough to include metrics of successful and failed requests and factor in latency, client-side load balancing becomes another extremely powerful technique, whereby applications can assess the relative health of downstream endpoints and decide to avoid the degraded endpoint without needing to first identify the root cause of failure. Any kind of health check capability is subject to some amount of inherent latency that corresponds to the periodic interval of the health check probe requests and/or retries. This may be too slow for low latency applications which would then attempt to do client-side load balancing themselves. Smart applications with self-healing can fail-away, fail-fast, and/or have circuit breakers to indicate degraded health to its clients.

In an exemplary embodiment, the use of synthetic transactions is another powerful telemetry technique that can be located within the same tier as a client and can collect health metrics and provide signals to a system that has the capability to act and programmatically scale up or scale down or even configure the Load Balancers to fail away from an affected availability zone and/or restore the affected availability zone.

In an exemplary embodiment, the cloud platform may shut down critical applications based upon an application's declared manifest. This is very useful under degraded network conditions when multiple types of traffic are impacted. Any external reactor cannot send a message successfully to the impacted platform to shut down services under such impaired network conditions.

A well-behaved element is a general specification for any tier, be it an end user client, interim load balancers, application, or cloud platform. If every tier can have elements that conform to this specification, then when an error occurs, including a grey failure, then the element is able to handle such an error in a resilient fashion, automatically. The quick resolution lowers the client impact and increases availability of the application/service making 5 9's achievable.

Using an example of application 1 in a multi-tier network, it must cater to an service level agreement (SLA) of 5 9's i.e. 99.999% from the end user client's view. If the application under question has a daily traffic of 500K transactions, then there is a tolerance of a failure of 0.001% or a maximum of 500 failures/day due to any unresolved/unmanaged/unhealed errors in any of the tiers within the multi-tier network.

Conversely, using another example of application 2, which has the same 5 9's SLA expectation from its end user client, but has a traffic of 60 million requests per day. Then it can have up to 60 thousand errors per day, which is much higher than app 1's 500 errors/day.

A Sensitivity Index is defined herein as the average number of allowable failures per app divided by the number of allowed failures for the given app over the same time period (e.g. per day). The sensitivity index is higher for a more sensitive app that can tolerate fewer errors than another app. If the average number of allowable failures is 10,000 then for an app with 99.999% SLA, and 500K transactions per day, then the app can tolerate only 500 failures/day and has a Sensitivity Index of 2. For another app having the same 5 9's SLA expectation with 60 million requests per day, the app can tolerate up to 60 thousand errors/day giving an index of 0.167 So, App 1 may be deemed as being more sensitive and as being harder to design for, as it can tolerate far fewer errors. Mitigating actions that should be taken for apps with high Sensitivity Index include: a relative increase of timeouts in the tier above and/or reduction in timeouts to tier below so that retries can be triggered earlier; a relative increase frequency of health probes and/or synthetic transactions so that issues are discovered earlier; a relative reduction of fail-away thresholds and increase of fail-back thresholds; and a relative reduction in threshold for raising alarms when health deteriorates.

Figure 5:
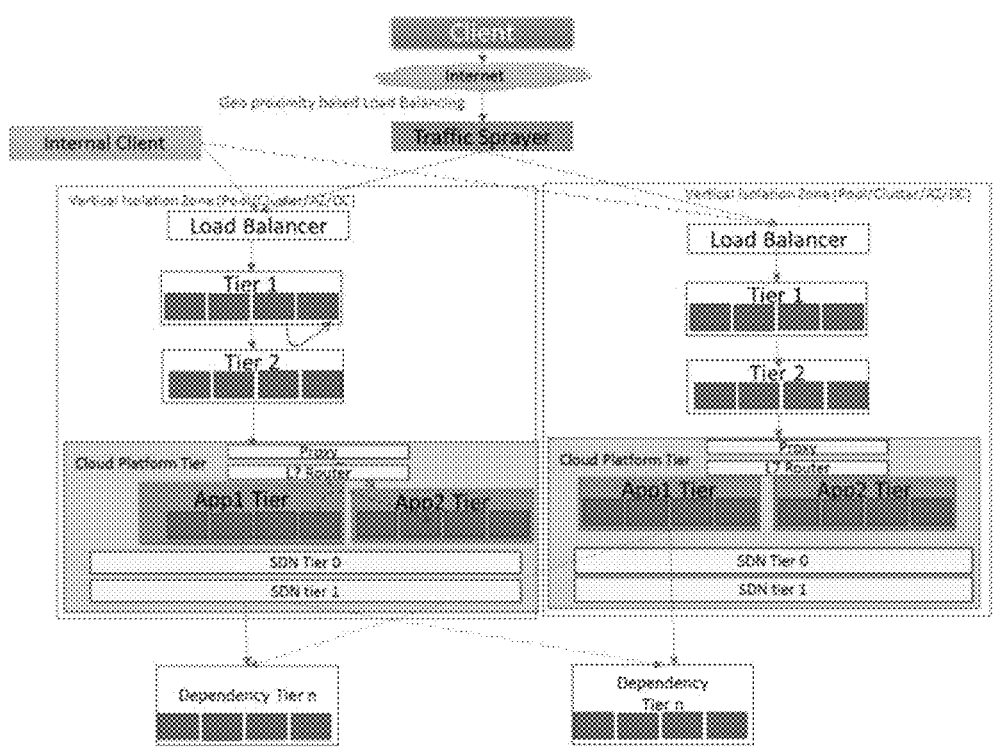
FIG. 5 is a block diagram that illustrates a multi-tier network with well behaved elements for seamless resiliency, according to an exemplary embodiment.

FIG. 5 is a block diagram 500 that illustrates a multi-tier network with well behaved elements for seamless resiliency, according to an exemplary embodiment.

In an exemplary embodiment, a well-behaved element satisfies design principles as follows. First, the well-behaved element must adhere to graceful shutdown, finishing its in-flight requests during a grace period, i.e. quiescence, before it is forcefully shut down. During the stopping period, it must not accept any new requests and return a 503 error. The tier above must not send any traffic to it during the shut-down period. If there are race conditions, e.g. when the tier above cannot establish a transport layer security (TLS) connection to an app instance, or when its gets a specific 503 error, it must retry the failed request at another healthy instance.

Second, the well-behaved element must be scaled sufficiently to handle its own enhanced health checks asynchronously, but also be able to respond to increased number of health checks from tiers above. It must be scaled to have enough redundancy for not only single, but double or triple failures.

Third, the well behaved element must be deployed with vertical isolation, in adherence to the tier above and tier below, thereby creating a smokestack or vertical slice end to end of the multi-tier deployment. It must not be shared across vertical isolation zones, as that would blur the ability of the tier above to check its health and cordon off traffic. This is extremely useful to contain traffic when impairment is present. Every element in the tier must be a well-behaved element and be deployed with vertical isolation, and routers above must preferentially select a healthy vertical isolation that is closest in proximity to end user client, thus offering lowest latency and best service. It must not have a single point of failure (SPOF) and the health check measurement must provide extremely high weightage to failure/degradation of any critical SPOF elements in the vertical isolation zone. To accommodate sensitive applications, a bulkhead pattern must be used in tiers above in order to guarantee that sufficient servicing capacity is reserved for the sensitive app, thereby protecting it from other noisy neighbors that could otherwise have consumed all the resources, thus starving the sensitive app.

There are usually at least 2 edge elements, i.e., elements of a particular tier that can steer traffic across vertical isolation zones. Only on failure does it retry at another vertical isolation zone.

Steering Edge element behavior: If the well-behaved element is at the upper edge, then it is the topmost element that is immediately above multiple vertical isolation zones and so it must perform a special function. It must choose which zone to send traffic to, based on enhanced health checks for each vertical isolation zone, as further described below. It then must use proper traffic steering (i.e., load balancing algorithms) as also further described below. Note that a vertical isolation alone can contain a nested/child vertical isolation zone in a particular tier. The element that sits immediately on top of a child/nested availability zone becomes an edge element.

Application edge element behavior: If the other edge element is the application itself, which in turn has to call another application, it can choose to do so to an instance of the second application within its own vertical isolation zone. If the app2 is degraded, then it can choose to invoke app2 in another vertical isolation zone, thus behaving much like an edge element, above. An application can also have dependencies. These dependencies can have one of 2 configurations.

In one configuration, the dependency is within the same vertical isolation zone, and hence the app will call its local vertical isolation zone's dependency. If the dependency fails, then it acts like a single point of failure and returns an error to its layer above, The edge element will then steer traffic away based on the health check as described below. If the dependency has a seamless backup that promotes to primary behind a Virtual IP (VIP), then the health check still suffices.

If the dependency is not common to or shared across multiple isolation zones like a database or Kafka cluster, then it is necessary for the application to have internal resiliency mechanisms that will try to access the dependency in an external isolation zone (e.g. remote Kafka cluster) before returning a failed health check (similar to checking primary and secondary/backup DB).

If there is no higher tier, and no other healthy vertical isolation zone of tier below, then the client should at least startup, and show the unavailability of service/degraded health to the user.

Figure 6:
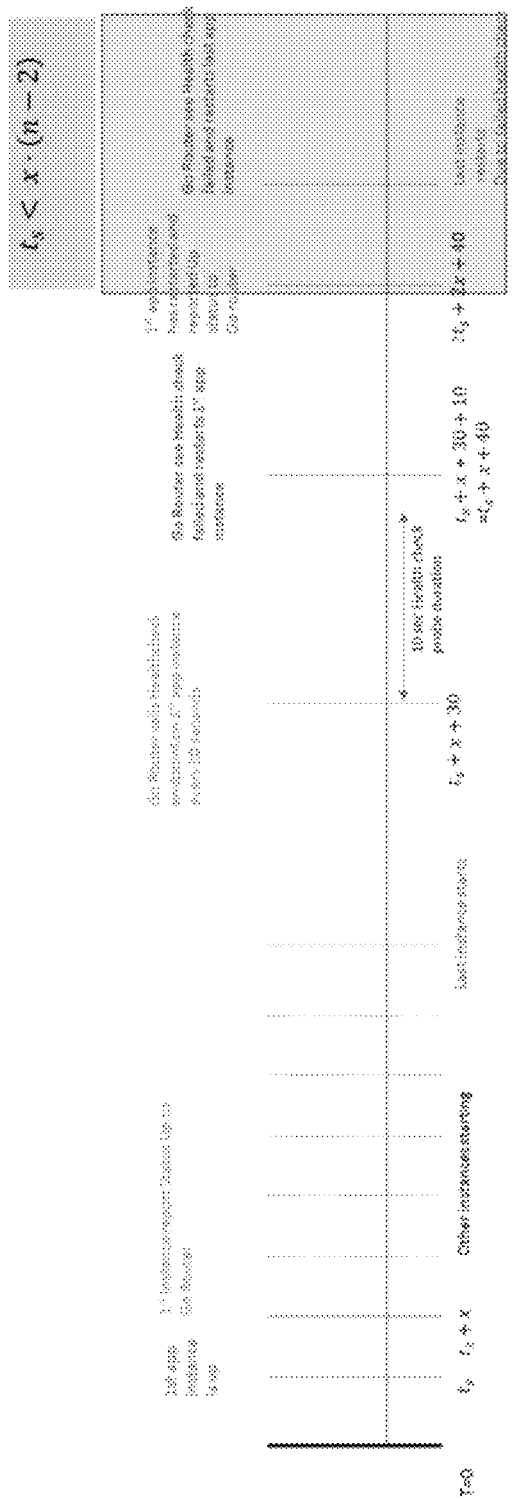
FIG. 6 is a diagram that illustrates a mechanism that ensures that at least one instance is always operational when health checks fail in a multi-tier network with well behaved elements for seamless resiliency, according to an exemplary embodiment.

The well-behaved element must satisfy stringent deployment requirements. It must have staggered start up times for each instance across the vertical isolation zone, and also across such zones, so that in totality, there will always be at least one app that is always up, even under a continuous restart condition, upon failing a health check. FIG. 6 is a diagram 600 that illustrates a mechanism that ensures that at least one instance is always operational when health checks fail in a multi-tier network with well behaved elements for seamless resiliency, according to an exemplary embodiment.

The well-behaved element must only include critical dependencies in its health check. The overall health check has a timeout that must be greater than the individual timeouts for each dependency's health check. Also, the tiers below the well-behaved element must have lower timeout values.

Any software update to a well-behaved element must be fully tested within the vertical isolation zone, before updating another vertical isolation zone and propagating errors/failures due to bad software updates, rendering multiple zones unavailable.

A compensating mechanism for non-well-behaved elements, elements where there is no way to control or change its behavior to be a well-behaved element such as a vendor supplied elements, or shared LBs where health checks are not granular enough, are as follows: First, ensure this element is deployed in vertical isolation zones like a well-behaved element. Second, add enhanced well behaved health checks for the first tier above this non-well-behaved element's tier, where there is control. Third, use an external observer, including synthetic transactions to augment health checks to see if the non-well-behaved element is degraded. Fourth, use an external reactor to fail away and failback the non-well-behaved tier. Fifth, send alerts so that human intervention can be used to fail the load balancer above the non-well-behaved tier and divert traffic away from the unhealthy element or vertical zone. Sixth, similarly use an external reactor to fail back to element once it has been repaired.

The following is a description of a well behaved element. Intrinsic Observer: Gathers performance data according to the present disclosure about itself and its dependencies. Intrinsic Reactor: Takes corrective actions using data from its Intrinsic Observer. Extrinsic Observer: Gathers data indirectly about elements in the network. Extrinsic Reactor: Takes corrective actions for tiers that do not conform to the present disclosure.

Intrinsic Observer: Every element of each well-behaved tier must perform the role of an Intrinsic Observer. An Intrinsic Observer has a unique ID and, if possible, provides this ID in each response to a request from the tier above. The ID may be a random UUID or any system-unique value such as an IP-address. An Intrinsic Observer calculates an enhanced version of self-health by a variety of factors such as actual traffic, period, deliberate health checks, error rates of API responses, and latency threshold. An Intrinsic Observer calculates the "observed" health of each element in the tier below as a floating pointer number on the application-level responses received from the given element. Alternatively, an Intrinsic Observer models the health of the tier below as a single field if the tier cannot provide an ID in each response.

An Intrinsic Observer periodically probes the health of the tier below and stores the "provided" result. An Intrinsic Observer increases probe frequency when workload is low and decreases when latency of the health-response is high. An Intrinsic Observer.calculates the difference between the "observed" and the "provided" health in the health probe response. An Intrinsic Observer reports differences outside the $95^{th}$ percentile to a human monitoring application. An Intrinsic Observer aggregates metadata from each element in its own tier to understand how it is relative to its peers in the same tier, i.e., Spatial Awareness. This can work across instances, availability zones, Datacenters, clusters etc. An Intrinsic Observer responds to per-instance health probes from any tier above by providing its own health metadata including vertical isolation zone ID. An Intrinsic Observer responds to per-zone/per-tier health probes from any tier above by providing the aggregate health metadata for the given scope.

An Intrinsic Observer calculates the health of dependencies using the same technique as elements in the tier below. This includes dependencies in its own zone and where possible in other zones that can be used as fallbacks. An Intrinsic Observer may aggregate data about its own instance/zone/tier from an external observer as a factor in calculating its own health. An Intrinsic Observer creates "synthetic transactions" when the observed load falls below a minimum threshold so that up-to-date metadata is always available to calculate health. An Intrinsic Observer may send its health metrics to an external system periodically.

Every element should respond to a health probe with metadata that provides its unique-Id, own health as a floating-point number between 0 and 1, own request/response latencies in previous time-window, dependencies-health as an aggregate value or listed by name and value, number of successful transactions, number of failed transactions, number of retried transactions in rolling time windows (e.g., last probe or last 5 minutes), and include sensitivity index.

Mechanism to calculate own health: Identify a suitable time-window to measure health. This should reflect the amount of time required to overcome transitory failures that recover quickly without impact to service. Identify the normal long-term latency in returning successful responses to requests from the tier(s) above. The initial value should be configurable after which it should be self-learned. Identify a normal % memory usage and average-CPU-over-interval.

Self-health is a function of the following factors: Ratio of long-term latencies to recent latencies from success responses in time-window, noting that this indirectly includes retries. For example, if the long-term average is 6.7 ms and average over the time-window is 6.1 ms, then the latency normalization factor is 6.7/6.1=1.09 1. Ratio of successfully completed transactions. Ratio of available lower-tier elements, excluding those below minimum-threshold health, as the lower number reduces redundancy. Operating in a compromised mode, e.g. with minimal redundancy, or with overload protection activated. Operating above normal memory and/or CPU range. No transactions in time-window slightly reduces health because of uncertainty Future factors that will influence health (system or self-termination request).

The following table illustrates how various factors that contribute to self-health are weighted and used to derive this elements' overall health. In this example, the long-term latency of requests to the dependency is 0.38 ms and the average latency in the health time-window is 0.40 ms. This contribution to health is the ratio of long-term to short-term=0.95. The values of "Weighting" are tuned based on the relative important of each observation.

| Observation | Normalized Value | Weighting | Weighted Value |
|---|---|---|---|
| Ratio of my successfully completed transactions | 0.6 | 4.0 | 2.4 |
| My success response Latency Deviation | 0.95 | 2.0 | 1.9 |
| Average health of my dependencies | 0.88 | 1.0 | 0.88 |
| Total | | 7.0 | 5.18 |
| Average | | | 5.18/7.0 = 0.74 |

In addition, the element closest to the client should perform a deep health probe through travels along the same path as client requests down to the inner most element of the last tier.

Mechanism to aggregate performance data from all elements or zones within a tier: The Intrinsic Observer should have access to the health of every element or zone within its tier and use that information to provide an API that returns the locations at which the service is available, together with a weighting that provides a measurement of the performance at each location.

Intrinsic Observer Table Used to Support the Service Addresses with Weightings API:

| Element ID | Current Health | Service Address | Weighting |
|---|---|---|---|
| My-tier-1-0 | 0.85 | https://myplatform/tier-1-0 | 0.85/2.49 = 0.341 |
| My-tier-1-1 | 0.73 | https://myplatform/tier-1-1 | 0.73/2.49 = 0.293 |
| My-tier-1-2 | 0.91 | https://myplatform/tier-1-2 | 0.91/2.49 = 0.365 |
| Total | 2.49 | | 1.0 |

Mechanism to calculate dependency health: The mechanism to calculate health of an element in the tier below is similar to "self-health" but also includes any health reported by the tier below. The following table illustrates how various factors that contribute to health are weighted and used to derive the elements' overall health. In this example, the dependency is well behaved and so reports its own health in the response of a health-check. As before, a calculation may be made of the contribution of the ratio of successfully completed/total requests and the request/response latency.

| Observation | Normalized Value | Weighting | Weighted Value |
|---|---|---|---|
| Externally reported | 0.9 | 3.0 | 2.7 |
| Ratio of successfully completed transactions | 0.6 | 4.0 | 2.4 |
| Success response Latency Deviation | 0.95 | 2.0 | 1.9 |
| Total | | 9.0 | 7.0 |
| Average | | | 7.0/9.0 = 0.777 |

Example: Health calculation of a dependency reports its own health and when 60% of its requests complete successfully and is operating close to its long-term latency average.

Every element of each well-behaved tier must perform the role of an Intrinsic Reactor. In some use cases, the tier may be aware of individual elements in the tier below and in other use cases it is only aware of vertical-isolation zones in the tier below. An Intrinsic Reactor uses its Observer metadata to fail-fast at startup when critical dependencies are unreachable or otherwise unavailable; self-terminate when the health of this instance fails below a minimum threshold; and maintain a table of the health of elements or vertical-isolation zones in the tier below depending on the granularity exposed by each use-case. If the health of elements remain the same for several polling intervals, then the number of requests routed to each element is the total-load multiplied by Load-Factor of the given element. Given that increasing the load to one element may subsequently reduce its health, to avoid unwanted oscillations in traffic, the change in element health used in this calculation should be dampened so that the change is more gradual.

| Element/Zone ID | Current Health | Latest Health Reading | Next Health |
|---|---|---|---|
| AAAAAAAAAAAAAAAA | 0.85 | 0.85 | 0.85 |
| BBBBBBBBBBBBBBBB | 0.73 | 0.70 | (4 × 0.73 + 0.7)/5 = 0.724 |
| CCCCCCCCCCCCCCCC | 0.91 | 0.88 | (4 × 0.91 + 0.88)/5 = 0.904 |

Example: Downstream Tier Health Table with Changes Dampened by 80%

An Intrinsic Reactor also uses its Observer metadata to control the flow of requests to each element in the tier below, when the health of individual elements in the tier below are known and are routable, by maintaining a table of the element's health and target load-factor.

| Element/Zone ID | Element Health | Element Load Factor |
|---|---|---|
| AAAAAAAAAAAAAAAA | 0.85 | 0.85/3 × 0.83 = 0.341 |
| BBBBBBBBBBBBBBBB | 0.73 | 0.73/3 × 0.83 = 0.293 |
| CCCCCCCCCCCCCCCC | 0.91 | 0.91/3 × 0.83 = 0.365 |
| Average | (0.85 = 0.73 + 0.91)/3 = 0.83 | 0.333 |

Example: Load Factor Calculation Based on Element Health

An Intrinsic Reactor also uses its Observer metadata to control the flow of requests to dependencies using the same technique as described for requests to the tier below so that the element can continue to function optimally by failing-away from unhealthy dependency instances and failing-back when health improves. If dependency instances may be in another zone, then take into account the geo-proximity cost.

If the tier consists of instances of the client application or is the first tier above a vertical isolation zone, then the internal reactor should use the similar logic when selecting which zone to use for requests. The reactor can calculate the optimal zone including geo-proximity (i.e., in order to minimize latency) but multiplying the weights in each row.

| Element ID | Relative Zone Health Weighting | Zone Geo-proximity weighting | Relative Zone Score |
|---|---|---|---|
| Zone-A | 0.341 | 0.6 | 0.341 × 0.6 = 0.204 |
| Zone-B | 0.293 | 0.3 | 0.293 × 0.3 = 0.0879 |
| Zone-C | 0.365 | 0.1 | 0.365 × 0.1 = 0.0365 |
| Total | 1.0 | 1.0 | |

Example: Zone Selection Considering Health and Geo-Proximity (Zone-A is Optimal)

A client application is a special case of the Intrinsic Reactor. This algorithm causes the client application to fail-away from an element/zone when it becomes unhealthy and to fail-back when health is restored. On finding that there is no healthy lower tier available, a well-behaved Client Intrinsic Reactor should be able to startup and display a useful error message. In the case of a web-application, this requires the ability to load static pages from a web-server in the same or fallback location.

A cloud platform is a special case of an Intrinsic Observer/Reactor as it consists of its own Availability Zones and those zones host many of the tiers as described in the present disclosure. The cloud platform is configured to perform each of the following actions: perform relative comparison between AZ's; shut down low-latency high-sensitivity app while allowing less sensitive apps to continue to run in a degraded pool; shut down entire AZ if unstable related to other AZ's or if the failures exceed a threshold; shut down ailing interim elements by identification (i.e., HA Proxy, Go Router, Apps); and scale down/up based on memory/CPU/latency metrics.

Extrinsic Observer: An Extrinsic Observer operates independently of the tier(s) that it is observing and does not use the health-monitoring mechanisms described in the present disclosure. The tier(s) that it observes may or may not be well-behaved as defined above, but at a minimum, elements in the tier must output observable data such as logging or performance metrics from the underlying platform. Logs can be automatically exported to an aggregator that analyzes them to detect known error conditions, high latency, etc. Distributed tracing solutions such as Zipkin or Jaeger can be used to identify the path of a request from tier to tier and identify the steps that incurred the highest latency. Telemetry such as the number of requests processed, current memory, and CPU can be collected by systems such as Prometheus and displayed on dashboards such as Grafana.

The Cloud Platform may provide other custom app monitoring systems such as Cloud Watch or X-Ray. The Extrinsic Observer may use synthetic transactions to calculate the tier's health as would be seen by the tier above. This may differ from the Intrinsic Observer's calculation, for example if there are network issues between internal and external observers. An Extrinsic Observer may be monitoring several tiers and come to a conclusion that a vertical isolation zone may be impaired. It can detect where the latency is occurring within an end user to application.

Limitations: Any network errors that may occur between the tier being observed and the tier above or between the tier and an external observer system, must be handled in the following manner: Absence of receiving a health count as an error; and any Quiescence must be known by the Extrinsic Observer to avoid false failures.

Extrinsic Reactor: An External Reactor uses the data gathered by the Extrinsic Observer to manually or automatically take corrective action necessary to optimize performance. The Extrinsic Reactor scales a number of instances up and down depending on overall health and anticipated demand, and stops all elements within a vertical isolation zone during maintenance or when the difference between health in its vertical isolation zone vs other zones exceeds a threshold. In a Software Designed Networking system, the Extrinsic Reactor may change the IP addresses associated with elements at the edge of the cloud in order to enable or disable a vertical isolation zone.

Limitations: An Extrinsic Reactor has some limitations as compared to an Intrinsic Reactor, including the following: The Extrinsic Reactor cannot control elements of a tier if the network prevents it from reaching the elements. The Extrinsic Reactor can take incorrect mitigating action if it misdiagnoses issues caused by its own networking issues.

Accordingly, with this technology, an optimized process for mitigating partial and intermittent failures in a distributed cloud-based data center in order to provide resiliency and continuity for end users is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for mitigating a failure in a distributed cloud-based data center that includes at least two availability zones, each respective availability zone including a corresponding plurality of components, the method being implemented by at least one processor, the method comprising:
   checking, by the at least one processor, each respective component from among a first plurality of components included in a first availability zone;
   detecting, by the at least one processor, at least one partial failure that is associated with at least one component from among the first plurality of components;
   routing, by the at least one processor, at least one communication flow so as to avoid the at least one component for which the at least one partial failure has been detected;
   generating, by the at least one processor, a notification message that includes information that relates to the detected at least one partial failure; and
   transmitting, by the at least one processor, the notification message to a predetermined destination,
   wherein the routing comprises routing the at least one communication flow so as to avoid the first availability zone, and
   wherein the method further comprises:
   determining, based on a result of checking each respective component from among a second plurality of components included in a second availability zone, that all components in the second plurality of components are functioning normally,
   wherein the routing further comprises routing the at least one communication flow so as to propagate via the second availability zone.

2. The method of claim 1, wherein the checking comprises measuring, for each respective component, at least one health metric that indicates whether the respective component is functioning normally.

3. The method of claim 2, wherein the checking further comprises:
   generating a synthetic service request;
   routing the synthetic service request so as to propagate via each of the first plurality of components;
   receiving, from each respective component, a corresponding response to the synthetic service request; and
   using each received response to measure each corresponding at least one health metric.

4. The method of claim 1, further comprising:
   receiving information indicating that an operational functionality has been restored for the at least one component for which the at least one partial failure has been detected; and rerouting the at least one communication flow so as to propagate through the at least one component for which the operational functionality has been restored.

5. The method of claim 1, further comprising updating a database with information that relates to a number of partial failures that are detected within a predetermined time interval.

6. The method of claim 5, further comprising updating the database with information that relates to a number of components that are determined as functioning normally within the predetermined time interval.

7. The method of claim 1, wherein the at least one partial failure includes at least one from among a hardware failure, a network disruption, a communication overload, a performance degradation, a random packet loss, an input/output glitch, a memory thrashing, a capacity pressure, and a non-fatal exception.

8. A computing apparatus for mitigating a failure in a distributed cloud-based data center that includes at least two availability zones, each respective availability zone including a corresponding plurality of components, the computing apparatus comprising:
  a processor;
  a memory; and
  a communication interface coupled to each of the processor and the memory,
  wherein the processor is configured to:
    check each respective component from among a first plurality of components included in a first availability zone;
    detect at least one partial failure that is associated with at least one component from among the first plurality of components;
    route at least one communication flow so as to avoid the at least one component for which the at least one partial failure has been detected;
    generate a notification message that includes information that relates to the detected at least one partial failure; and
    transmit, via the communication interface, the notification message to a predetermined destination,
  wherein the processor is further configured to route the at least one communication flow so as to avoid the first availability zone, and
  wherein the processor is further configured to:
    determine, based on a result of checking each respective component from among a second plurality of components included in a second availability zone, that all components in the second plurality of components are functioning normally; and
    route the at least one communication flow so as to propagate via the second availability zone.

9. The computing apparatus of claim 8, wherein the processor is further configured to measure, for each respective component, at least one health metric that indicates whether the respective component is functioning normally.

10. The computing apparatus of claim 9, wherein the processor is further configured to:
  generate a synthetic service request;
  route the synthetic service request so as to propagate via each of the first plurality of components;
  receive, from each respective component, a corresponding response to the synthetic service request; and
  use each received response to measure each corresponding at least one health metric.

11. The computing apparatus of claim 8, wherein the processor is further configured to:
  receive information indicating that an operational functionality has been restored for the at least one component for which the at least one partial failure has been detected; and
  reroute the at least one communication flow so as to propagate through the at least one component for which the operational functionality has been restored.

12. The computing apparatus of claim 8, wherein the processor is further configured to update a database with information that relates to a number of partial failures that are detected within a predetermined time interval.

13. The computing apparatus of claim 12, wherein the processor is further configured to update the database with information that relates to a number of components that are determined as functioning normally within the predetermined time interval.

14. The computing apparatus of claim 8, wherein the at least one partial failure includes at least one from among a hardware failure, a network disruption, a communication overload, a performance degradation, a random packet loss, an input/output glitch, a memory thrashing, a capacity pressure, and a non-fatal exception.

15. An automatically self-healing multi-tier system for providing seamless resiliency, comprising:
  a plurality of tiers of elements;
  a processor;
  a memory; and
  a communication interface coupled to the processor, the memory, and each respective tier of elements from among the plurality of tiers of elements,
  wherein the processor is configured to:
    determine whether each respective tier of elements satisfies each of a plurality of intrinsic observer capabilities, a plurality of intrinsic reactor capabilities, a plurality of first health checks received from an internal tier, and a plurality of second health checks received from an external tier;
    when at least one from among the plurality of intrinsic observer capabilities and the plurality of intrinsic reactor capabilities is not satisfied, use at least one from among a plurality of extrinsic observer capabilities and a plurality of extrinsic reactor capabilities to compensate for the unsatisfied capability; and
    when at least one from among the plurality of first health checks and the plurality of second health checks is not satisfied, route at least one communication flow so as to avoid the tier of elements for which the corresponding health check is not satisfied.

16. The system of claim 15, wherein the processor is further configured to measure, for each respective tier of elements, at least one health metric that indicates whether the respective tier of elements is well-behaved.

* * * * *